June 9, 1925.
L. O. DAVIS
CLUTCH
Filed Aug. 12, 1922
1,541,411
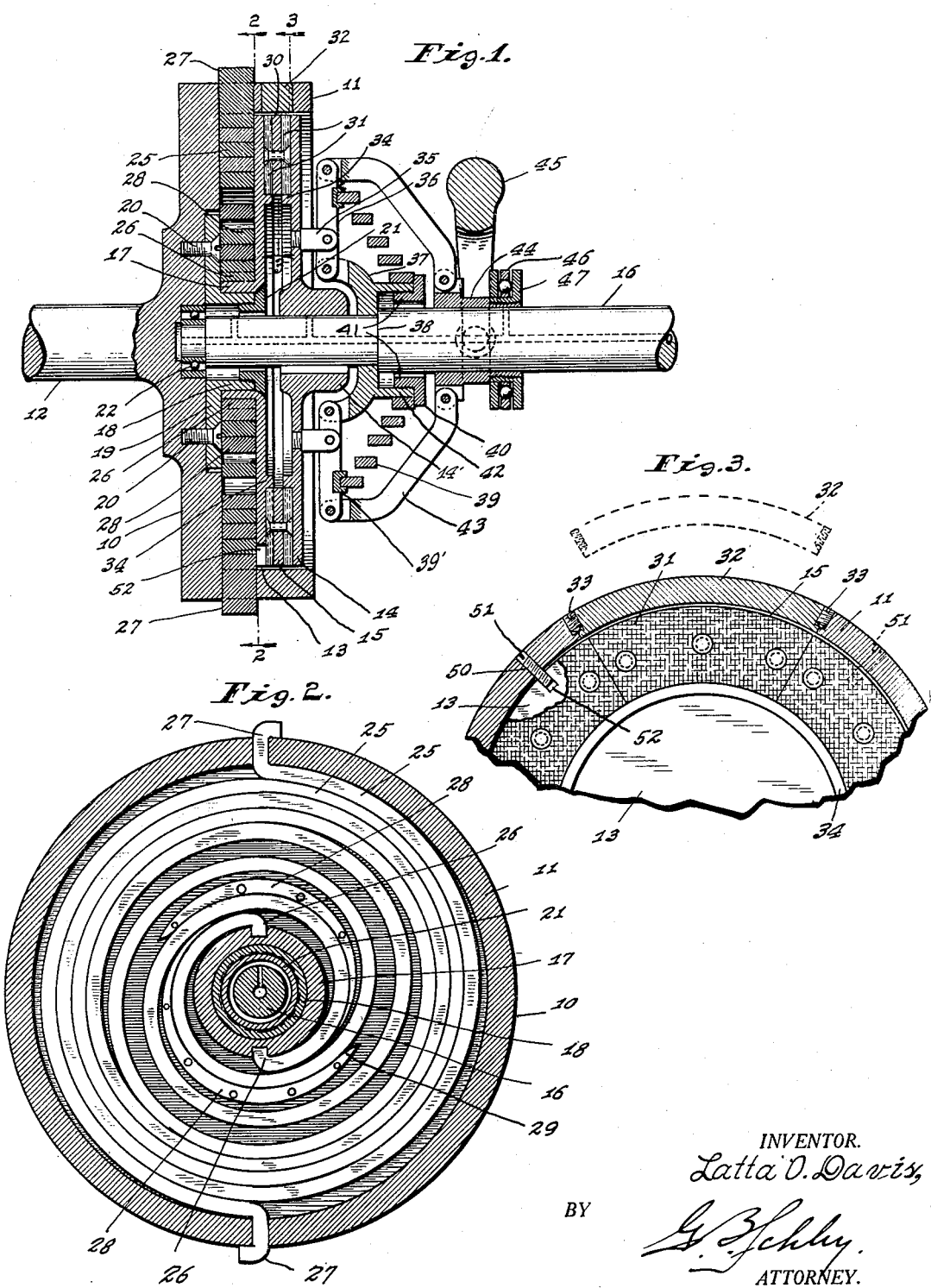
INVENTOR.
Latta O. Davis,
BY
ATTORNEY.

Patented June 9, 1925.

1,541,411

UNITED STATES PATENT OFFICE.

LATTA O. DAVIS, OF INDIANAPOLIS, INDIANA, ASSIGNOR TO WILLIAM M. FOGARTY, TRUSTEE, OF INDIANAPOLIS, INDIANA.

CLUTCH.

Application filed August 12, 1922. Serial No. 581,301.

*To all whom it may concern:*

Be it known that I, LATTA O. DAVIS, a citizen of the United States, residing at Indianapolis, in the county of Marion and State of Indiana, have invented a new and useful Clutch, of which the following is a specification.

It is the object of my invention to produce a clutch, especially an automobile clutch, in which there is a balanced cushioning spring between the flywheel and the clutch; in which the friction ring of the clutch is removable and replaceable through an opening in the rim of the flywheel without requiring the entire dismantling of the clutch, so that in consequence a worn-out friction ring may be replaced in much less time than has heretofore been necessary; in which the setting and releasing mechanism of the clutch, including the setting spring, is a unit which can be put on and removed from the shaft as a unit, but requires no fastening to the shaft otherwise than a bearing against a shoulder thereon; and in which a simple emergency locking device is provided between one clutch member and the flywheel in the event of the breakage or other disabling of the cushioning spring.

The accompanying drawing illustrates my invention: Fig. 1 is a longitudinal section through a clutch embodying my invention; Fig. 2 is a transverse section on the line 2—2 of Fig. 1, to show the balanced spring; and Fig. 3 is a fragmentary section on the line 3—3 of Fig. 1, to show the removable segment of a fly-wheel rim and the sectional construction of the friction ring, and also to show the locking means between one clutch member and the flywheel.

The flywheel 10 may be in general of the usual type, with a rim 11, and is carried in any suitable way on the rear end of the crank-shaft 12 of the automobile engine. Within the rim 11 is a clutch composed of two clutch members 13 and 14 and a friction ring 15 between them. The hub 14' of the clutch member 14 is splined on the clutch-shaft 16, so that by its movements along such shaft it will set and release the clutch. The clutch member 13 is provided with a hub 17 mounted on the outside of an annular flange 18 carried by a plate 19 fastened to the inner face of the flywheel 10, as by screws 20. The hub 17 can turn on the flange 18, but is held against longitudinal movement thereon by a flanged clamping plug 21 screwed into the projecting end of the flange 18 so that its flange bears against the clutch member 13. The clutch-shaft 16 preferably extends through the clamping plug 21, the hub 17, and the flange 18, so that its end may be supported in a ball-bearing 22 at the center of the flywheel 10.

The hub 17 is connected to the flywheel rim 11 by a pair of spiral springs 25. These two spiral springs are similar, and are intercoiled with each other but with their corresponding ends spaced 180° apart. The inner ends of the spiral springs 25 have inturned fingers 26 which are received in diametrically opposite notches in the outer face of the hub 17. The outer ends of the springs 25 have out-turned hooked fingers 27 which project through diametrically opposite holes in the flywheel rim 11. The coiling of the springs 25 is such that as the crank-shaft 12 is turned by the engine it tends to wind up the springs 25; and through them to drive the clutch-shaft 16.

The coil springs 25 are not uniformly coiled. They are coiled so that when at rest the greatest spacing between turns is toward the inside of the coil, as is clear from Fig. 2. As the springs are wound up by the torque between the crank-shaft 12 and the clutch-shaft 16, they coil tightly about the hub 17, so that the spacing between turns of the coils travels outward toward the flywheel rim. The first turn at the inside end of each coil at all times passes closely against the inturned finger 26 of the other coil, so that each coil holds the finger 26 of its companion in place in its notch in the hub 17, and does so more tightly as the springs are stressed. I prefer to provide crescent-shaped lugs 28 between the inmost half-turn or more of each coil 25 and the radially outward adjacent part of the other coil, to prevent undue bending of either spring over the finger 26 of its companion spring. This avoids any point of undue bending on the spring. Preferably the inner surface of each lug 28 at that end 29 which is farther from the shaft axis is rounded off to avoid a point of undue bending of the spring in case of reverse power-transmission; as when the car is coasting and driving the engine, and the engine is acting as a brake. The lugs 28 are suitably fastened to that face of the clutch member 13 which is toward the springs 25. By having the two springs 25, each connected at opposite points to both the flywheel rim 11 and the hub 17, I get a balanced cushioning action free from any tendency to produce lateral movement between the shafts 12 and 16, so that the clutch parts may be made lighter because they are free from unbalanced distorting stresses.

The friction ring 15 of the clutch is made in sections, as is clear from Fig. 3. Each section is in the shape of a sector of the ring, conveniently of about one-sixth or one-eighth the circumference, though the angular extent of the sectors is immaterial. Each sector, in the preferred form shown, comprises a central metal plate 30, with a facing 31 of friction material on each side. The flywheel rim is provided with a removable sector 32 in the plane of the friction ring 15. This sector 32 is preferably of slightly greater angular extent than is a sector of the friction ring, as is clear from Fig. 3; and is removably held in its place in the flywheel rim 11 in any suitable manner, as by radial screws 33 located half in the sector 32 and half in the body of the rim 11. By removing the screws 33, the rim sector 32 is loosened and may be removed; leaving an opening which may be brought to the bottom of the flywheel to let the segments of the friction ring drop out one at a time, by relative rotation of the ring and flywheel, and which may be brought to the top of the flywheel to permit the dropping in of the segments of the friction wheel one at a time. The segments are held from going too far in by annular flanges 34 on the adjacent faces of the clutch members 13 and 14. After the segments of the friction ring are put in place, the sector 32 is put back in place and fastened there by the screws 33. This makes it possible to repair or replace the friction ring when it is worn, without dismantling the entire clutch, and thus reduces the labor bill for repair to a small fraction of what it would otherwise be.

The relative movement between the clutch members 13 and 14 as required for setting and releasing the clutch may be obtained in any suitable manner, but I prefer to use the arrangement illustrated in Fig. 1. In such arrangement, the clutch member 14 is provided with a circular series of attaching forks 35, conveniently screwed into such clutch member; and these forks are pivoted to intermediate points on a similar circular series of radial levers 36. There may be any desired number of forks 35 and levers 36, from two up. The inner ends of the levers 36 are pivoted to a collar 37 which bears against a shoulder 38 on the clutch-shaft 16 and needs no other fastening. A coiled conical spring 39 co-axial with the clutch shaft 16 bears against the levers 36 near their outer ends, conveniently through an interposed ring 39' to equalize the effect on the several levers, and acts between such levers and the flange 40 of a screw plug 41 screwed within a rearwardly extending tubular flange 42 from the collar 37. Thus the spring 39 really acts between the levers 36 and the collar 37, and by its expansion keeps the collar 37 seated against the shoulder 38. The outer ends of the levers 36 are connected by links 43 to a clutch-actuating sleeve 44 slidable on the clutch-shaft 16 and suitably operated by the fork 45 of the usual clutch-pedal, conveniently with a thrust bearing 46 interposed between the fork 45 and a suitable flange 47 on such clutch-actuating collar. When the clutch pedal is depressed, the outer ends of the levers 36 are drawn rearward, to compress the spring 39 and to release the friction ring of the clutch, thus releasing the clutch. When the clutch pedal is allowed to rise, the resultant expansion of the spring 39 forces the outer ends of the levers 36 forward to move the clutch members 13 and 14 together to grip the friction ring 15 and thus set the clutch. The whole clutch-actuating mechanism may be assembled on the clutch member 14, and slid on the clutch-shaft 16 as a unit, the clutch member 14 of course on its spline, and no fastening is required other than the reaction of the parts.

In order to provide for emergencies, in case the springs 25 break, I preferably provide some means for interconnecting the clutch member 13 directly to the flywheel 10 independently of the springs 25. While this may be done in various ways, a convenient way is to provide in the flywheel rim 11 one or more threaded holes 50 (see Fig. 3), which may receive screws 51 which when screwed in will project inward beyond the flywheel rim into holes or notches 52 provided in the outer edge of the clutch member 13. There may be any desired number of these holes 50 and 52, all of course in the plane of the clutch member 13.

I claim as my invention:

1. In combination, a flywheel having a rim projecting axially to form a housing, a clutch located within said housing and having relatively movable clutch members which by such relative movement set and release the clutch, one of said clutch members having an axially projecting hub, a ring carried by said flywheel and providing a bearing for said hub, and a spiral spring between said hub and the rim of the flywheel.

2. In combination, a flywheel having a rim projecting axially to form a housing, a clutch located within said housing and having relatively movable clutch members which by such relative movement set and release the clutch, one of said clutch members having an axially projecting hub, and a spiral spring between said hub and the rim of the flywheel.

3. In combination, a flywheel having a rim projecting axially to form a housing, a clutch located within said housing and having relatively movable clutch members which by such relative movement set and release the clutch, one of said clutch members having an axially projecting hub, a ring carried by said flywheel and providing a bearing for said hub, and a plurality of intercoiled spiral springs interconnecting said hub and the rim of the flywheel.

4. In combination, a flywheel having a rim projecting axially to form a housing, a clutch located within said housing and having relatively movable clutch members which by such relative movement set and release the clutch, one of said clutch members having an axially projecting hub, and a plurality of intercoiled spiral springs interconnecting said hub and the rim of the flywheel.

5. In combination, a flywheel having a rim projecting axially to form a housing, a clutch located within said housing and having relatively movable clutch members which by such relative movement set and release the clutch, one of said clutch members having an axially projecting hub, and a plurality of intercoiled spiral springs interconnecting said hub and the rim of the flywheel, the connections of said spiral springs to said flywheel rim and to said hub respectively being substantially equally spaced around the circumference thereof.

6. In combination, a flywheel having a rim projecting axially to form a housing, a clutch located within said housing and having relatively movable clutch members which by such relative movement set and release the clutch, one of said clutch members having an axially projecting hub, and a plurality of intercoiled spiral springs interconnecting said hub and the rim of the flywheel, said spiral springs at their inner ends being provided with inwardly turned fingers which project into notches in said hub, and each spring being arranged to bear on its neighboring spring over such inturned finger to hold the latter in place.

7. In combination, a flywheel having a rim projecting axially to form a housing, a clutch located within said housing and having relatively movable clutch members which by such relative movement set and release the clutch, one of said clutch members having an axially projecting hub, a plurality of intercoiled spiral springs interconnecting said hub and the rim of the flywheel, and crescent-shaped lugs carried by said hubbed clutch member for guiding the coiling of said springs near their inner ends.

8. In combination, a flywheel having a rim projecting axially to form a housing, a clutch located within said housing and having relatively movable clutch members which by such relative movement set and release the clutch, one of said clutch members having an axially projecting hub, and a spiral spring between said hub and the rim of the flywheel, said spring normally having its turns spaced farther apart toward the inner end than at the outer end so that as the spring is wound there is space for coiling around the inner end.

9. In combination, a flywheel having a rim projecting axially to form a housing, a clutch located within said housing and having relatively movable clutch members which by such relative movement set and release the clutch, one of said clutch members having an axially projecting hub, and a plurality of intercoiled spiral springs interconnecting said hub and the rim of the flywheel, said springs normally having their turns spaced farther apart toward the inner ends than at their outer ends so that as the springs are wound there is space for coiling around the inner ends.

10. In combination, a shaft, a clutch having relatively movable members, one of which is slidable on said shaft, a collar on said shaft, said shaft having a shoulder against which said collar abuts, levers pivoted to said collar and projecting outward therefrom, said levers being connected at intermediate points to said clutch member which is slidable on said shaft, a spring acting between said collar and points on said levers farther outward thereon than the points of connection to said clutch member, and means for swinging said levers to compress said spring.

11. In combination, a shaft, a clutch having relatively movable members one of which is slidable on said shaft, a collar on said shaft, said shaft and collar being provided with means for limiting their relative axial movement, levers pivoted to said collar and projecting outward therefrom, said levers being connected at intermediate points to said clutch member which is slidable on said shaft, a spring acting between said collar and points on said levers farther outward thereon than the points of connection to said clutch member, and means for swinging said levers to compress said spring.

12. In combination, a shaft, a clutch having relatively movable members one of which is slidable on said shaft, a collar on said shaft, said shaft having a shoulder against which said collar abuts, levers pivoted to said collar and projecting outward therefrom, said levers being connected at intermediate points to said clutch member which is slidable on said shaft, a spring acting between said collar and points on said levers farther outward thereon than the points of connection to said clutch member, a sliding clutch-actuating sleeve, and means connecting said sleeve to the outer ends of said levers.

13. In combination, a shaft, a clutch having relatively movable members one of which is slidable on said shaft, a collar on said shaft, said shaft and collar being provided with means for limiting their relative axial movement, levers pivoted to said collar and projecting outward therefrom, said levers being connected at intermediate points to said clutch member which is slidable on said shaft, a spring acting between said collar and points on said levers farther outward thereon than the points of connection to said clutch member, a sliding clutch-actuating sleeve, and means connecting said sleeve to the outer ends of said levers.

14. In combination, a shaft, a clutch having relatively movable members one of which is slidable on said shaft, a collar on said shaft, said shaft having a shoulder against which said collar abuts, levers pivoted to said collar and projecting outward therefrom, said levers being connected at intermediate points to said clutch member which is slidable on said shaft, a spring acting between said collar and points on said levers farther outward thereon than the points of connection to said clutch member, a ring interposed between said spring and said levers, and means for swinging said levers to compress said spring.

15. In combination, a shaft, a clutch having relatively movable members one of which is slidable on said shaft, a collar on said shaft, said shaft and collar being provided with means for limiting their relative axial movement, levers pivoted to said collar and projecting outward therefrom, said levers being connected at intermediate points to said clutch member which is slidable on said shaft, a spring acting between said collar and points on said levers farther outward thereon than the points of connection to said clutch member, a ring interposed between said spring and said levers, and means for swinging said levers to compress said spring.

16. In combination, a flywheel, a friction clutch having relatively axially movable clutch members which by such axial movement may be clutched together or de-clutched, said flywheel and one of said clutch members having interassociated bearing parts which hold them co-axial, and a pair of intercoiled spiral springs between one of said clutch members and said flywheel.

17. In combination, a flywheel, a friction clutch having relatively axially movable clutch members which by such axial movement may be clutched together or de-clutched, one of said clutch members having a hub, a part carried by said flywheel and upon which said hub fits for holding such clutch member and flywheel co-axial, and a pair of intercoiled spiral springs connected at their inner ends to said hub and at their outer ends to said flywheel.

18. In combination, a flywheel, a friction clutch co-axial with said flywheel and having a plurality of clutch members which can be clutched together and de-clutched, said flywheel being provided with an annular supporting surface on which one of said clutch members has a bearing, and the clutch and flywheel being spaced apart to provide a transverse annular space, and a spiral spring located in said annular space and interconnecting said flywheel and a member of said clutch.

19. In combination, a flywheel, a friction clutch co-axial with said flywheel and having a plurality of clutch members which can be clutched together and de-clutched, said flywheel being provided with an annular supporting surface on which one of said clutch members has a bearing, and the clutch and flywheel being spaced apart to provide a transverse annular space, and a spiral spring located in said annular space and interconnecting said flywheel and a member of said clutch, the part to which the outer end of said spiral spring is connected being provided with a rim-flange which overlies said spring and forms a housing which limits the expansion of said spring.

20. In combination, a flywheel, a friction clutch co-axial with said flywheel and having a plurality of clutch members which can be clutched together and de-clutched, said flywheel being provided with an annular supporting surface on which one of said clutch members has a bearing, and the clutch and flywheel being spaced apart to provide a transverse annular space, and a spiral spring located in said annular space and having its outer end connected to said flywheel and its inner end connected to the clutch member which has a bearing on the flywheel.

21. In combination, a flywheel, a friction clutch co-axial with said flywheel, and having a plurality of clutch members which can be clutched together and de-clutched, said flywheel being provided with an annular supporting surface on which one of said clutch members has a bearing, and the clutch and flywheel being spaced apart to provide a transverse annular space, and a spiral spring located in said annular space and having its outer end connected to said flywheel and its inner end connected to the clutch member which has a bearing on the flywheel, said flywheel being provided with a flange which overlies the periphery of said spiral spring and forms a housing which limits the expansion of such spring.

22. In combination, two relatively rotatable parts, a friction clutch between said two parts for interconnecting them, and a plurality of intercoiled springs interposed between said clutch and one of said parts which said clutch interconnects, each such spring normally having its turns spaced farther apart toward the inner end than at the outer end so that as the spring is wound there is space for coiling around the inner end.

23. In combination, two relatively rotatable parts, a friction clutch between said two parts for interconnecting them, and a spring interposed between said clutch and one of said parts which said clutch interconnects, such spring normally having its turns spaced farther apart toward the inner end than at the outer end so that as the spring is wound there is space for coiling around the inner end, such wider spacing of spring-turns extending for at least one complete turn from the inner end of the spring.

24. In combination, two relatively rotatable parts, a friction clutch between said two parts for interconnecting them, a plurality of intercoiled springs interposed between said clutch and one of said parts which said clutch interconnects, and guiding means carried by the member to which the inner ends of said springs are connected and located between spring-turns for guiding the coiling of said springs near their inner ends.

25. In combination, two relatively rotatable parts, a friction clutch between said two parts for interconnecting them, a spring interposed between said clutch and one of said parts which said clutch interconnects, and guiding means carried by the member to which the inner end of said spring is connected and located between spring-turns for guiding the coiling of said spring near its inner end.

26. In combination, two relatively rotatable parts, a friction clutch between said two parts for interconnecting them, a pair of intercoiled springs interposed between said clutch and one of said parts which said clutch interconnects, and spacing means for producing between adjacent spring-turns a crescent-shaped space.

27. In combination, two relatively rotatable parts, a friction clutch between said two parts for interconnecting them, a spring interposed between said clutch and one of said parts which said clutch interconnects, and spacing means for producing between adjacent spring-turns a crescent-shaped space.

28. In combination, two relatively rotatable parts, a friction clutch between said two parts for interconnecting them, a pair of intercoiled springs interposed between said clutch and one of said parts which said clutch interconnects, and spacing means for producing between adjacent spring-turns a space which is wide intermediately of the ends of the space and gradually becomes narrower at the two ends of the space to permit such adjacent spring-turns to approach gradually into contact without a sharp bending point.

29. In combination, two relatively rotatable parts, a friction clutch between said two parts for interconnecting them, a spring interposed between said clutch and one of said parts which said clutch interconnects, and spacing means for producing between adjacent spring-turns a space which is wide intermediately of the ends of the space and gradually becomes narrower at the two ends of the space to permit such adjacent spring-turns to approach gradually into contact without a sharp bending point.

In witness whereof, I have hereunto set my hand at Indianapolis, Indiana, this 9th day of August, A. D. one thousand nine hundred and twenty-two.

LATTA O. DAVIS.